P. J. CONROY.
RAIL SECURING INSTRUMENTALITY.
APPLICATION FILED JAN. 30, 1920.
1,418,286.
Patented June 6, 1922.
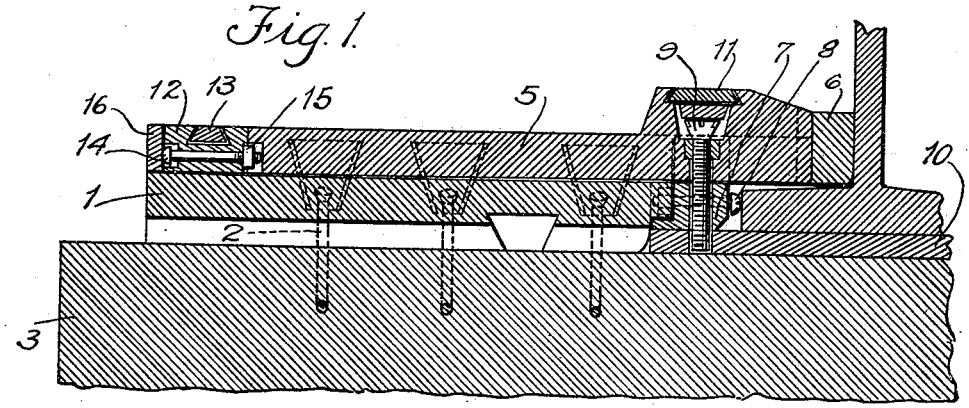
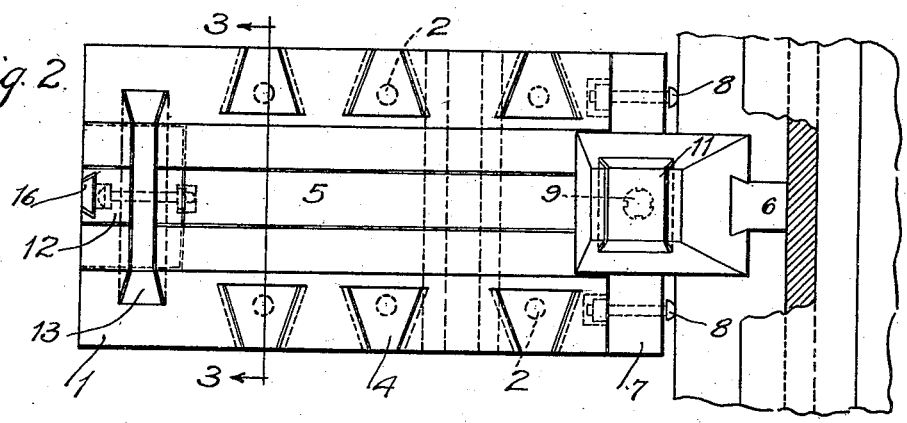
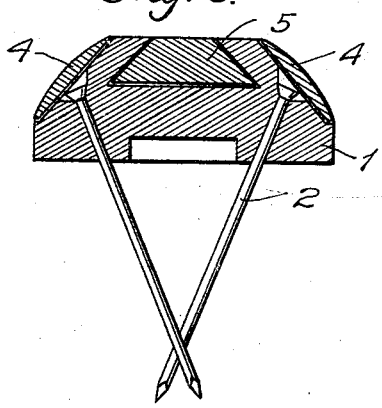
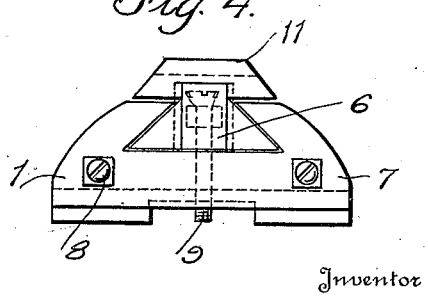
Inventor
Peter J. Conroy
By Langdon Moore, Attorney

UNITED STATES PATENT OFFICE.

PETER JOSEPH CONROY, OF SCRANTON, PENNSYLVANIA.

RAIL-SECURING INSTRUMENTALITY.

1,418,286. Specification of Letters Patent. Patented June 6, 1922.

Application filed January 30, 1920. Serial No. 355,226.

*To all whom it may concern:*

Be it known that I, PETER J. CONROY, a citizen of the United States, residing at Scranton, Pennsylvania, have invented certain new and useful Improvements in a Rail-Securing Instrumentality, set forth in the annexed specification, reference being had therein to the accompanying drawing.

This invention comprises a rail securing instrumentality. It is contemplated among the objects of the invention, to provide a device of this character which may be affixed to a tie in such a way that the spikes or other securing means will be locked in place and prevented from working out; wherein a sliding bolt is associated with the device in such a way that it may be adjusted in relation to a rail, may be withdrawn from engagement with the rail, and when placed for securing the rail, will brace it, prevent creeping or spreading of the rail, and securely hold it in fixed relation to the tie.

Other objects and advantages will be in part apparent and in part brought out more in detail in the description which follows.

Accompanying the application is a drawing, illustrating an embodiment of the invention, the following views being shown.

Fig. 1, is a view in longitudinal section;
Fig. 2, is a view in top plan;
Fig. 3, is a view in section on line 3—3, of Fig. 2;
Fig. 4, is a view in end elevation.

In these views, 1 designates a base plate or body portion of the instrumentality. It is provided with openings driven slantingly, preferably, and in angular relation to the plane of the base, wherein may be retained spikes 2, or other means for securing the plate to a tie or the like 3.

Means are provided for retaining the spikes locked against displacement when they are driven home, and as here shown, comprise a wedge or locking member 4, suitably held as in a slot or groove disposed above the head of the spike within the body portion or base-plate.

Extending longitudinally of the plate there is a channel or grooved slot within which there is adapted to slide a bolt 5. One end of this bolt carries a resilient bearing member 6, adapted to engage the web of a rail, while at the same end there is secured, as by a bolt, a base engaging member 7. This bearing 6 has, preferably, sound deadening or vibration absorbing qualities, and may be made of felt, rubber, or the like. This latter member extends outwardly along the length of the rail and is provided with means for adjustably engaging the base of the rail, such as threaded bolts 8, which are secured to member 7 and have their heads normally bearing against the edge of the base of the rail. The adjusting bolts 8 are provided with nuts, countersunk in a portion of bolt 5, the shanks passing through member 7, and the heads bearing against the edge of the base of the rail. These heads are provided with screw slots through which they are turned to make the proper adjustment. Member 7 is secured to the end of bolt 5 as by a threaded bolt 9, and if desired, a plate 10 may be disposed beneath the base of the rail and in threaded engagement with the bolt. Bolt 9 is locked against displacement as by a cover or closure member 11, disposed in a slot in the base plate, disposed above the head of the bolt.

When adjusted in relation to the rail, the bolt 5, bearing member, 6, and base engaging member 7, form a positive backing, brace and securing means for the web and base of the rail, and means are provided for fixing the position of the bolt with relation to the rail and for permitting its withdrawal to permit removal of the rail. As here shown, there is a block 12 disposed in the end of the slot back of bolt 5. This block is held in place by a cross key or dovetail locking member 13, disposed in slots traversing the slot in which bolt 5 travels, and disposed in the block there is a bolt or the like 14 threaded into a nut 15, and having one end bearing against the end of bolt 5 and the other against a locking member 16. This locking member is in the form of a dovetail, and is slidable in ways formed in bolt 5, as best seen in Fig. 2. The position of the bolt 14 in the block determines the position of bolt 5 with relation to the rail, and withdrawal of key or dovetail locking member 13 permits the block 12 and bolt 5 to be withdrawn, after bolt 9 in the other end of the bolt 5 has been removed. This permits the rail to be raised and freed. A transverse dovetail channel is provided in the base for the reception of means for connecting a series of blocks together to assist in steadying them against lateral wabbling, and more firmly secure the members together.

While the invention has been described in connection with the embodiment here shown, various changes are within the scope of the invention as set forth in the claims.

What I claim is:

1. A rail securing instrumentality comprising a base provided with openings for the reception of means for securing it to a tie; means, slidable transversely with relation to the openings for locking the securing means to the base when the securing means are operatively placed in the openings; a rail engaging member slidably mounted on the base; a rail base engaging member slidably mounted on the rail engaging member; and means for independently adjusting the position of the rail engaging member and of the rail base engaging member with relation to the rail.

2. The structure set forth in claim 1, wherein means are provided for permitting removal and withdrawal of the rail engaging member from the rail.

3. The structure set forth in claim 1, wherein the base engaging member is detachably secured to the rail engaging member, and means upon the base engaging member for adjustably engaging the base of a rail.

4. The structure set forth in claim 1, wherein the means for adjustably securing the rail engaging member within the base plate comprise a block slidably mounted within the base-plate; and means including a slidable member for retaining the block in position within the base-plate.

5. The structure set forth in claim 1, wherein means are provided in the block for adjusting the rail engaging member with relation to a rail, and such means including a bolt threaded into the block and having a portion in engagement with the rail engaging member.

6. A rail securing instrumentality comprising a base plate provided with openings therein for the reception of means for securing it to a tie; slidable keys adapted to cover and hold the securing means against withdrawal when they have been inserted within the openings to secure the base to the tie; a rail engaging member mounted on the base plate and adapted to move longitudinally thereon; a resilient rail engaging cushion disposed on its rail engaging end; means for adjusting the position of the rail engaging member with relation to the rail; a base engaging member associated with the rail engaging member; and slidable keys, locking the means for adjusting the position of the rail engaging member, against withdrawal.

In testimony whereof I affix my signature.

PETER JOSEPH CONROY.